Figure 1:
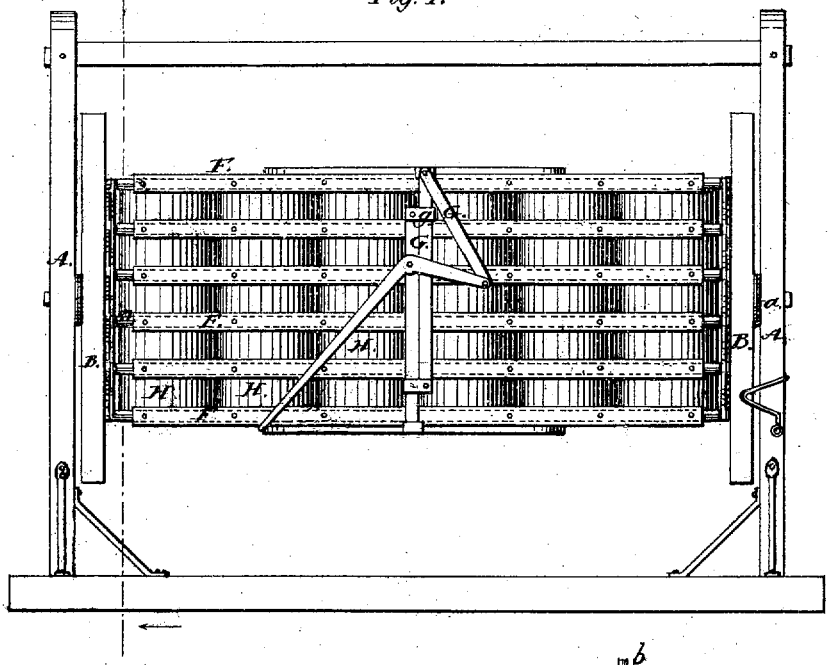
Figure 2:
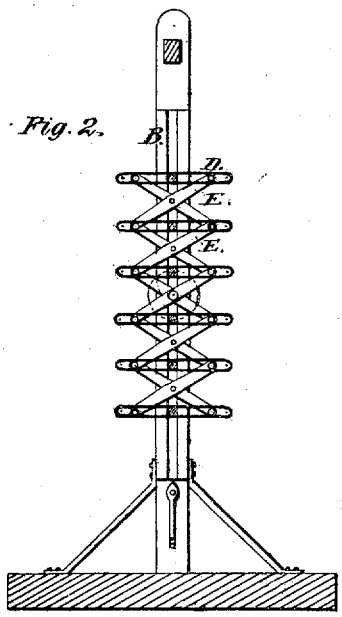
Figure 3:
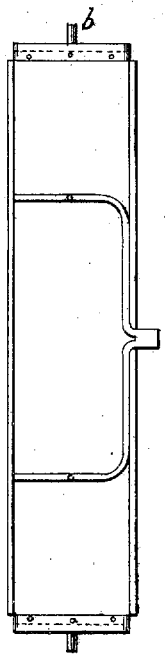

THOMAS M. BRINTNALL.

Improvement in Cheese Frames.

No. 5,006. Reissued July 30, 1872.

Witnesses.

R. Gillmore

M. L. Gardner.

Inventor:

Thomas M. Brintnall.

AM. PHOTO-LITHOGRAPHIC CO. N.Y. (OSBORNE'S PROCESS.)

UNITED STATES PATENT OFFICE.

THOMAS M. BRINTNALL, OF MEDINA, OHIO, ASSIGNOR, BY MESNE ASSIGNMENTS, OF PART INTEREST TO R. B. WALKER AND W. W. PANCOAST.

IMPROVEMENT IN CHEESE-FRAMES.

Specification forming part of Letters Patent No. 117,974, dated August 15, 1871; reissue No. 5,006, dated July 30, 1872.

*To all whom it may concern:*

Be it known that I, THOMAS M. BRINTNALL, of Medina, in the county of Medina, State of Ohio, have invented a new and Improved Cheese-Frame; and I declare the following to be a full, clear, and exact description of the same, such as will enable others skilled in the art to which it pertains to make and use it, reference being had to the accompanying drawing which forms a part of this specification, being the same drawing that accompanied the original specification.

In the accompanying drawing, A are uprights. B are grooved swinging posts, pivoted to the uprights at *a*. These posts are grooved so as to admit the guide-pin *b* of slotted band D and guide-pin of lazy-tongs E, and to allow the same to be operated in opening and closing the shelves F, which shelves are stiffened by edgings; said edgings also keeping the cheeses in place. G is a hoisting-jack, attached to the upper and lower shelves, and is used to open and close the frame or rack. H represents cheeses.

My invention consists of a rotary frame and suitable uprights for support of the same. Said frame consists of grooved posts, lazy-tongs, friction-rollers, slotted bands with guide-pins, shelves with edgings, and hoisting-jack, and is connected with the uprights, which support it, and on which it rotates by means of a gudgeon and washers.

The operation of my invention is as follows: Having arranged the cheeses H upon the shelves F, when it is desired to turn them seize the handle of the hoisting-jack G, carry it to the right or left, as the case may require, which will bring the shelves close to the cheeses. When the necessary pressure has been obtained, the jack may be secured, by means of a dog, at *g*. The frame may now be easily revolved by pressure against the lower shelf or either post. The shelves may be opened by reversing the jack. Should the cheeses happen to slip in turning, the edgings of the shelves will prevent them from falling.

I claim as my invention—

1. The shelves F provided with the guide-band D and pin *b*, in combination with the jointed levers E and slotted guide-post B, substantially as and for the purpose specified.

2. The combination of the shelves, the jointed levers E, and slotted guide-post B with the axis and washer *a*, uprights A, and the compressing device G *g*, substantially as and for the purposes specified.

3. The combination of the flanged shelves F, the jointed levers E, slotted guide-post B, axis and washer *a*, uprights A, and the compressing device G *g*, substantially as and for the purposes specified.

4. The compressing and expanding shelves, for the purpose specified.

5. The compressing and expanding shelves F, secured to the hub *a* in the manner set forth, and arranged substantially as described, so that, in turning, the cheeses at the bottom take the places of those at the top, and vice versa, for the purpose of securing even drying.

THOMAS M. BRINTNALL.

Witnesses:

L. C. STURGES,

W. W. PANCOAST.